(12) United States Patent
Macpherson

(10) Patent No.: US 8,543,336 B2
(45) Date of Patent: Sep. 24, 2013

(54) DISTRIBUTED MEASUREMENT OF MUD TEMPERATURE

(75) Inventor: John D. Macpherson, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 368 days.

(21) Appl. No.: 12/582,742

(22) Filed: Oct. 21, 2009

(65) Prior Publication Data

US 2010/0106421 A1  Apr. 29, 2010

Related U.S. Application Data

(60) Provisional application No. 61/107,375, filed on Oct. 22, 2008.

(51) Int. Cl.
*G01K 13/00* (2006.01)
*E21B 47/06* (2012.01)

(52) U.S. Cl.
CPC .............. *E21B 47/06* (2013.01); *E21B 47/065* (2013.01)
USPC ................................ 702/6; 702/130; 374/136

(58) Field of Classification Search
CPC ............................. E21B 47/06; E21B 47/065
USPC ........................................................... 702/6
See application file for complete search history.

(56) References Cited

U.S. PATENT DOCUMENTS

| | | | | |
|---|---|---|---|---|
| 4,520,666 A | * | 6/1985 | Coblentz et al. ........... | 73/152.33 |
| 4,575,261 A | * | 3/1986 | Berger et al. ................. | 374/136 |
| 4,765,183 A | * | 8/1988 | Coury ........................ | 73/152.03 |
| 5,892,860 A | * | 4/1999 | Maron et al. .................... | 385/12 |
| 6,206,108 B1 | * | 3/2001 | MacDonald et al. ........... | 175/24 |
| 6,585,408 B2 | * | 7/2003 | El-Gabry et al. ............... | 374/43 |
| 6,618,677 B1 | * | 9/2003 | Brown ............................ | 702/13 |
| 6,789,937 B2 | * | 9/2004 | Haddad et al. ................ | 374/136 |
| 6,920,395 B2 | * | 7/2005 | Brown ............................ | 702/13 |
| 2003/0103551 A1 | * | 6/2003 | Haddad et al. ................ | 374/136 |
| 2005/0149264 A1 | * | 7/2005 | Tarvin et al. ...................... | 702/6 |
| 2006/0250274 A1 | * | 11/2006 | Mombourquette et al. .......................... | 340/854.9 |
| 2007/0213963 A1 | * | 9/2007 | Jalali et al. ...................... | 703/10 |
| 2007/0278009 A1 | * | 12/2007 | Hernandez ..................... | 175/40 |
| 2008/0073122 A1 | | 3/2008 | Blanz et al. | |
| 2009/0067329 A1 | * | 3/2009 | Sumasu et al. ................ | 370/232 |
| 2009/0173494 A1 | * | 7/2009 | Tarvin et al. ............. | 166/250.15 |
| 2010/0067329 A1 | * | 3/2010 | Edwards et al. ................ | 367/82 |
| 2012/0055672 A1 | * | 3/2012 | Tollefsen et al. ............. | 166/302 |

OTHER PUBLICATIONS

Holmes et al., Calculating of Circulating Mud Temperatures, Journal of Petroleum Technology, pp. 670-674, Jun. 1970.*
Raymond, L., Temperature Distribution in a Circulating Drilling Fluid, Journal of Petroleum Technology, Mar. 1969.*

(Continued)

*Primary Examiner* — Sujoy Kundu
*Assistant Examiner* — Timothy H Hwang
(74) *Attorney, Agent, or Firm* — Cantor Colburn LLP

(57) ABSTRACT

A method for estimating a temperature within sub-surface materials traversed by a wellbore includes: obtaining temperature data from a plurality of measurements of temperature taken within the wellbore; calculating an overall heat transfer coefficient from the measurement data; calculating a geothermal gradient from the overall heat transfer coefficient; and using the geothermal gradient to estimate the temperature within the sub-surface materials. A system and a computer program product are provided.

23 Claims, 5 Drawing Sheets

(56) References Cited

OTHER PUBLICATIONS

International Preliminary Report on Patentability and Written Opinion, Mailed May 5, 2011, International Appln. No. PCT/US2009/061693, Written Opinion 5 Pages, International Search Report 3 Pages.

Holmes C.S., Swift S.C., "Calculation of Circulating Mud Temperatures", Journal of Petroleum Technology, pp. 671-674, Jun. 1970.

\* cited by examiner

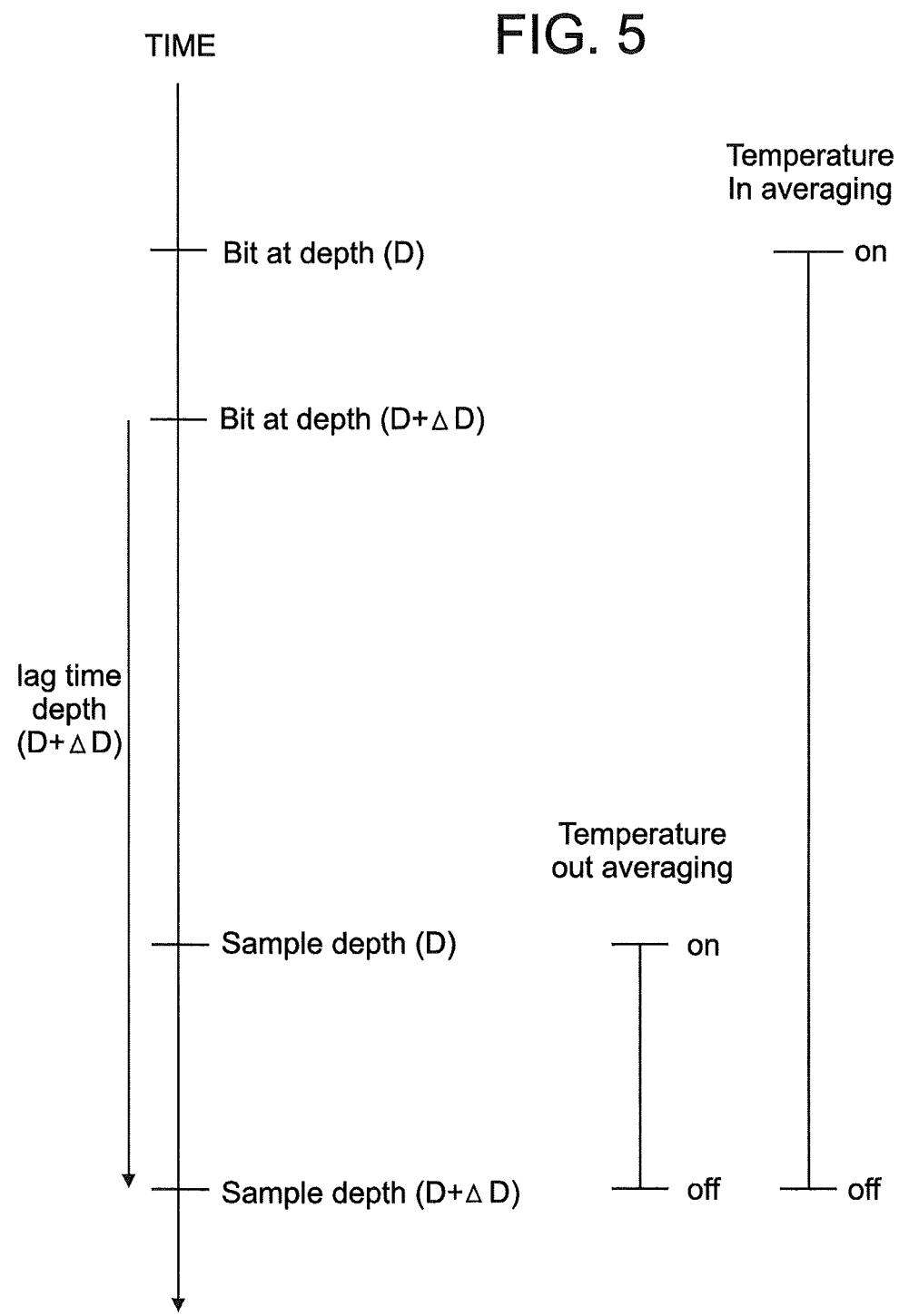

DISTRIBUTED MEASUREMENT OF MUD TEMPERATURE

CROSS-REFERENCE TO RELATED APPLICATIONS

This application claims the benefit of U.S. Provisional Application Ser. No. 61/107,375, entitled "Distributed Measurement of Mud Temperature", filed Oct. 22, 2008, under 35 U.S.C. §119(e), and which is incorporated herein by reference in its entirety.

BACKGROUND OF THE INVENTION

1. Field of the Invention

The invention disclosed herein relates to exploration for oil and gas and, in particular, to evaluation of temperature profiles downhole.

2. Description of the Related Art

In the exploration for oil and gas, it is necessary to drill a borehole into the earth. While drilling of the borehole permits individuals and companies to evaluate sub-surface materials and to extract desired hydrocarbons, many problems are encountered. Once such problem is that of elevated temperatures down hole.

Not only do elevated temperatures present a harsh environment to equipment downhole, but, the elevated temperatures may be indicative of properties of materials downhole.

Therefore, what are needed are methods and apparatus that provide for measurement of temperatures downhole. Preferably, the methods and apparatus provide information that is indicative of formation properties.

BRIEF SUMMARY OF THE INVENTION

An embodiment of the invention includes a method for estimating a temperature within sub-surface materials traversed by a wellbore, the method including: obtaining temperature data from a plurality of measurements of temperature taken within the wellbore; calculating an overall heat transfer coefficient from the measurement data; calculating a geothermal gradient from the overall heat transfer coefficient; and using the geothermal gradient to estimate the temperature within the sub-surface materials.

Another embodiment of the invention includes a system for determining a temperature of sub-surface materials, the system including: a plurality of temperature sensors distributed along a drill string, the drill string providing for a wellbore that traverses the sub-surface materials; and a processor for receiving temperature data from the from the plurality of temperature sensors along at least a portion of the wellbore and for implementing machine executable instructions for calculating an overall heat transfer coefficient from the measurement data; calculating a geothermal gradient from the overall heat transfer coefficient; and using the geothermal gradient to estimate the temperature within the sub-surface materials.

Yet another embodiment of the invention includes a computer program product stored on machine readable media and including machine executable instructions for estimating a temperature in sub-surface materials, by implementing a method including: receiving temperature data from a plurality of measurements of temperature taken within a wellbore traversed by a logging instrument; calculating an overall heat transfer coefficient from the measurement data; calculating a geothermal gradient from the overall heat transfer coefficient; using the geothermal gradient to estimate the temperature within the sub-surface materials; and outputting the estimate to a user.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 5 depicts aspects of temperature averaging.

DETAILED DESCRIPTION OF THE INVENTION

Disclosed are techniques for estimating far-field temperature in a downhole environment. Measurement of pipe and bore fluid temperatures along a drill string can be used to infer the far-field formation temperature gradient, which is affected by the volume of contained water, and hence pore pressure. The temperature data may be used for cementing operations in estimation of the needed cement properties, monitoring of the setting of the cement, and for other aspects as deemed appropriate. Knowledge of the far-field temperature and temperature gradient is therefore important for pore pressure prediction, cementing operations, and correction of measurements made by wireline or measurement-while-drilling tools, among others. The term "far-field" as used herein relates to being away from the influence or effects of the borehole.

In general, the techniques take advantage of flow line measurement data, and assume conditions of steady state heat flow within the borehole. That is, it is considered that heat flow across the various thermal resistances within the borehole is relatively constant, and therefore independent of time. It is recognized that, in general, under normal operational wellsite conditions, that such assumptions are more reliable once the wellbore has been circulated continuously for at least one circulation. Before discussing the invention in detail, some context is provided.

Figure 1:
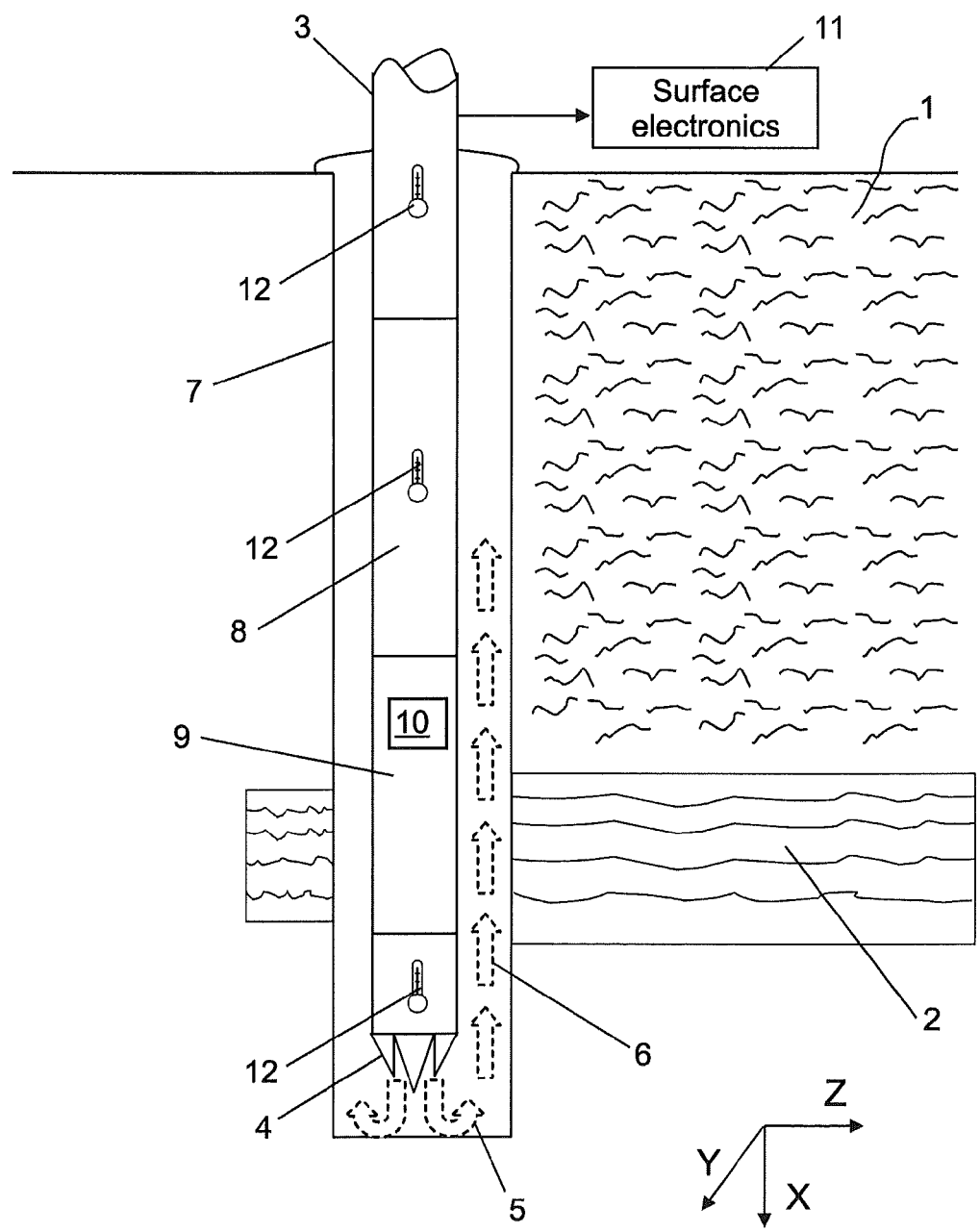
FIG. 1 depicts aspects of a drilling apparatus, and shows a flow of drilling fluid within a borehole.

Refer now to FIG. 1 where aspects of a drill string are shown. In FIG. 1, an exemplary embodiment of an apparatus for performing logging while drilling is shown. In this example, a section of earth 1, which includes at least one formation 2, is penetrated by a drill string 3. The drill string 3 drives a drill bit 4. In this example, the drill bit 4 also provides a flow of a drilling fluid 5, such as drilling mud. That is, the drilling fluid 5 may be pumped downhole through the drilling pipe 8, and thus resulting in a flow of drilling fluid 6 that is provided upward within a borehole 7 (also referred to as a "wellbore").

The drill string 3 may include a plurality of sections of the drill pipe 8. The drill pipe 8 may include wired pipe providing users with a communications channel. Included within the drill string 3 may be at least one logging apparatus 9. Exemplary logging apparatus include devices implementing resistivity, nuclear magnetic resonance, acoustic, seismic and other such technologies. Generally, included with the logging apparatus 9 is a package of downhole electronics 10. The downhole electronics 10 generally provide for collection and/or communication of downhole data to a package of surface based electronics 11. Included in this drill string 3 is a plurality of temperature sensors 12. The drill string 3 may also be referred to as "drill stem," and by other similar terms.

Collectively, the logging apparatus 9 and the associated electronics 10, 11 provide for such tasks as imaging of the at least one formation 2. In addition, the logging apparatus 9 and the associated electronics 10, 11 may provide for collection and/or communication of other information, such as temperature from each of the temperature sensors 12.

Generally, each of the temperature sensors 12 is disposed such that the respective temperature sensor 12 is operable for detection of local temperature, including a temperature of the drilling fluid 5. Each of the temperature sensors 12 provides a signal to at least one of the electronics units 10, 11. Generally, each temperature sensor 12 communicates an identity with the sensor output. Using identity and temperature, the electronics units 10, 11 are provided with adequate information for determining a temperature gradient within the borehole 7. In some embodiments, and as described herein, each of the electronics unit(s) 10, 11 may, alone or in combination, further estimate a far-field temperature (i.e., a temperature within some portion of the earth 1 and/or the formation 2).

In general, bore temperature and annulus temperature is measured at an outlet and an inlet (suction pit), and at several locations along the drillstring 3. These measurements, which may be made in real-time, are used by a temperature model to predict the far-field temperature. Since abnormal temperature gradients occur above and through intervals of abnormal pore-pressure, the predictions of far-field temperature may be used in real-time, such as while drilling. In some embodiments, modeling calls for use of other measurements, such as revolutions per minute (RPM), and formation properties (such as porosity). Accordingly, now consider certain input information useful for modeling far-field temperature.

Inputs useful for modeling far-field temperature include geometry of the borehole 7 (also referred to as a "wellbore"). The information may include, for example, presence, number, dimensions and/or quality of casing strings, holes, cemented intervals and other such information. Mud composition may be used as an input and may consider, for example: particle properties, constituent identities and types, oil percentage, heat capacity, etc, . . . . Also of interest is the temperature inside the drill string 3 and outside of the drill string 3.

Output of models used for estimating the far-field temperature include: a far-field formation temperature gradient; a drilled interval formation temperature gradient; a bottom hole circulating temperature; and a formation temperature.

In general, the teachings herein may be reduced to the form of an algorithm, and described in machine executable instructions stored on machine readable media (generally referred to herein as "software").

As an example of a model of circulating mud temperatures, under steady-state linear heat transfer, the temperature of the mud in the drillstem (within the drill string 3) is given by Eq. (1) (see Holmes C. S. and Swift S. C, 1970, Calculation of Circulating Mud Temperatures," JPT, June 1970, pp 670-674):

$$T_p = K_1 e^{(C_1 x)} + K_2 e^{(C_2 x)} + Gx + T_s - GA \qquad (1)$$

and the temperature of the mud in the annulus (outside of the drill string 3 and in the borehole 7) is given by Eq. (2):

$$T_a = K_1 C_3 e^{(C_1 x)} + K_2 C_4 e^{(C_2 x)} + Gx + T_s \qquad (2);$$

where:
$T_p$ represents temperature in the drillstem at depth (x), in degrees Fahrenheit (° F.);
$T_a$ represents temperature in the annulus at depth (x), in degrees Fahrenheit (° F.);
G represents the geothermal gradient, in degrees Fahrenheit per foot (° F./ft);
$T_s$ represents surface temperature, in degrees Fahrenheit (° F.);
x represents a depth of interest, in feet (ft);
$K_1$, $K_2$ represent integration constants, as defined below; and
$C_1$ through $C_4$ are constants given by:

$$C_1 = (B/2A)[1+(1+4/B)^{1/2}] \qquad (3.1)$$

$$C_2 = (B/2A)[1-(1+4/B)^{1/2}] \qquad (3.2)$$

$$C_3 = (1+B/2)[1+(1+4/B)^{1/2}] \qquad (3.3)$$

$$C_4 = (1+B/2)[1-(1+4/B)^{1/2}] \qquad (3.4)$$

$$A = m^* C p/(2\pi^* r p_0 ^* u p_0) \qquad (4)$$

$$B = r U_a/(r p_0 ^* u p_0) \qquad (5)$$

where
m represents mass flow rate, in lb/hr;
$C_p$ represents mud heat capacity, in Btu (lb–° F.);
$rp_0$ radius of drillpipe (outer diameter), in ft;
$up_0$ overall heat transfer coefficient across the drillpipe, in Btu/(ft$^2$–° F.–hr);
r represents hole radius, in ft; and,
$U_a$ overall heat transfer coefficient across the wellbore face, in Btu/(ft$^2$–° F.–hr).

Various boundary conditions may be applied to the preceding series of equations to derive an analytic solution for the integration constants. As an example, given in the preceding reference, the following boundary conditions may be applied:

1. At depth $x=0$: $Tp=Tp_{in}$ \qquad (B1)

2. At depth $x=H$: $T_{HP}=T_{Ha}$ \qquad (B2)

where
H represents total well depth (i.e., bit depth), in ft;
$Tp_{in}$ represents mud inlet temperature, in ° F.;
$T_{HP}$ represents drill stem temperature at depth H;
$T_{Ha}$ represents annulus temperature at depth H.
Then, $$K_1 = Tp_{in} - K_2 - T_s + GA \qquad (6)$$

and $$K_2 = \frac{GA - [Tp_{in} - T_s + GA]e^{(C_1^H)}(1-c_3)}{e^{(C_2^H)}(1-C_4) - e^{(C_1^H)}(1-C_3)}. \qquad (7)$$

Using the above boundary conditions, it is therefore possible to calculate the temperature at any depth downhole during circulation of the drilling fluid 5. However, this generally calls for pre-existing knowledge of the geothermal gradient in the formation (that is, inclusion of the term G into Eqs. (6) and (7) above). Since this information is not accessible, and the calculation of geothermal gradients is one of the objectives of the model, solving may apply another boundary condition, provided as Eq. (B3):

3. At depth $x=0$: $Ta=Ta_{out}$ \qquad (B3)

where
$Ta_{out}$ represents flowline temperature, in ° F.

This leads to:

$$Ta_{out} = K_1 C_3 + K_2 C_4 + T_s.$$

Using Eq. (6), this may be expressed as:

$$Ta_{out} = (T_{in} - K_2 - T_s + GA)C_3 + K_2 C_4 + T_s.$$

Finally, using Eq. (7) and solving for G (geothermal gradient), provides Eq. (8):

$$G = \frac{y(Ta_{out} - Ta) + (Tp_{in} - Ts)\left[(1 - C_3)(C_4 - C_3)e^{(C_1^H)} - yC_3\right]}{A\left[(y - 1)C_3 + C_4 - (1 - C_3)(C_4 - C_3)e^{(C_1^H)}\right]}, \quad (8)$$

where $$y = e^{(C_2^H)}(1 - C_4) - e^{(C_1^H)}(1 - C_3). \quad (9)$$

With knowledge of the geothermal gradient at depth x=H, the temperature of the formation 2 may be estimated using Eq. (10):

$$T_{fmn} = H^*G + Ts \quad (10).$$

The preceding development is given by way of an example. If the temperature within the annulus or pipe is known by other along string measurements, then it is possible to solve this model, or one similar to it, and arrive at an estimate of the far-field geothermal gradient.

Having thus introduced certain models and relationships, it should be recognized that several constants are directly related to both geometry of the borehole 7 and properties of the drilling fluid 5. Derivation of these is provided further herein. However, it is useful to discuss a method and calculation of the output parameters.

Figure 2:
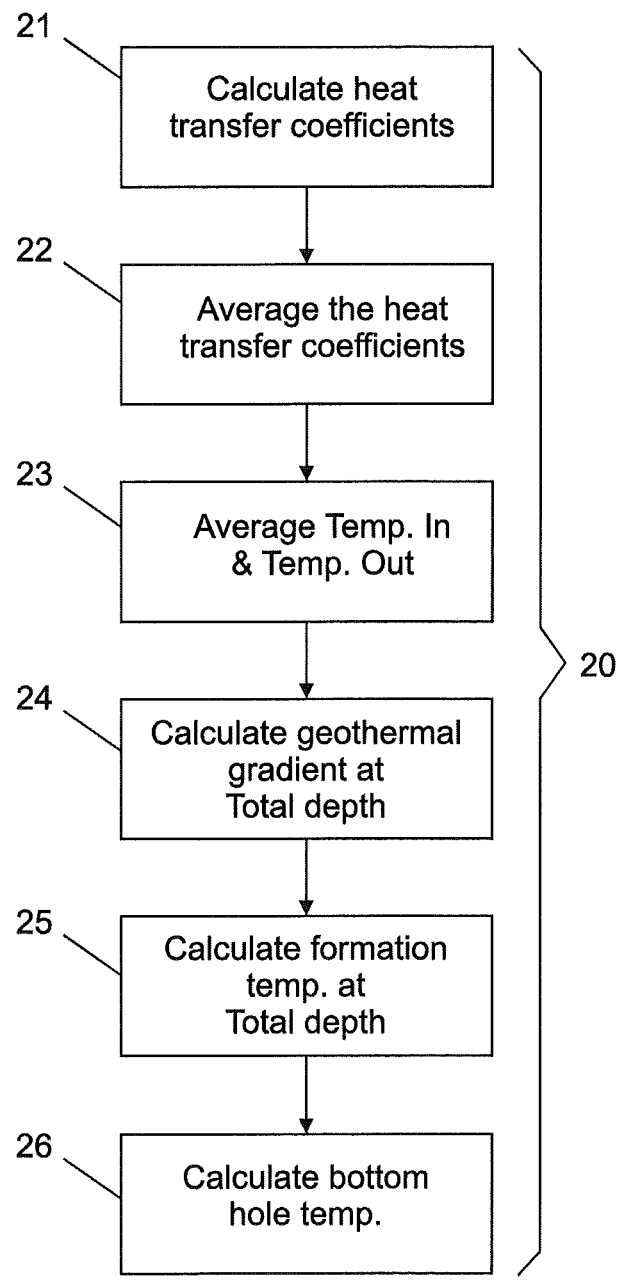
FIG. 2 is a flow chart providing an exemplary method for estimating temperatures related to a borehole.

Now with reference to FIG. 2, consider an exemplary method 20 for estimating formation temperature. In FIG. 2, the method 20 includes six stages (21-26). In a first stage 21, geometry of the borehole 7 is used (along with knowledge of aspects of a composition of the drilling fluid 5) to calculate heat transfer coefficients for each section of the borehole 7. In a second stage 22, the heat transfer coefficients are averaged, using as a base the amount of time the fluid is in each section of the hole. In a third stage 23, the temperature inside the drill string 3 and the temperature outside of the drill string 3 is averaged. In a fourth stage 24, a geothermal gradient is calculated at a total depth. This may be calculated, for example, by using Eqs. (3, 4, 5 and 8). In a fifth stage 25, the temperature of the formation is calculated at the total depth. This may be calculated, for example, by using Eq. (10). In a sixth stage 26, a bottom hole circulating temperature (BHCT) is calculated. This may be calculated, for example, by using Eqs. (6, 7 and either 1 or 2).

In some embodiments, instead of averaging, the heat transfer coefficients are "combined." That is, for example, the heat transfer coefficients may be fit, such as by use of a linear fit, logarithmic fit, exponential fit, a fit to a power function, a weighted fit or some other type of relationship.

Consider now, the calculation of constants for use in the equations provided herein. Mass flow rate (m) may be calculated as:

$$m = Q^* \rho_m{}^* 60 \text{ (expressed in lb/hr)};$$

where:
Q represents flowrate in gal/min; and,
$\rho_m$ represents density of mud, in lb/gal.

Heat capacity of mud, (Cp), may be calculated using the weight by volume of the individual components in the mud. The heat capacities of the individual components may be given as:

water: $Cp_w$ is approximately 1 Btu/(lb-° F.);
NaCl: $Cp_n = 0.12569 + 0.0000245(T)$, where T is in ° K.;
Solids: $Cp_s = 0.18 + 0.00006(T)$, where T is in ° F.; and
oil: $Cp_o = (0.388 + 0.00045(T))/S^{1/2}$, where T is in ° F. and S represents specific gravity.

With knowledge of the API gravity of the oil being used (where "API gravity" refers to a measure of how heavy or light a petroleum liquid is compared to water):

$$S = (°API + 131.5)/141.5$$

The heat capacity of the mud can therefore be calculated from:

$$Cp_m = \frac{(100 - x)Cp_w + yCp_n + zCp_s + lCp_o}{100}$$

where y, z and l are the percentage concentrations of the relative components, and $$x = y + z + l.$$

Rewriting these equations provides Eq. (11):

$$Cp_m = 1 + \frac{y}{100}(Cp_n - 1) + \frac{z}{100}(Cp_s - 1) + \frac{l}{100}(Cp_o - 1) \quad (11)$$

Note that the effect of the temperature term in the empirical equations is minimal, and that, in general, the flowline temperature may be used.

Consider now heat transfer gradients ($Up_o$ and $U_a$). Under steady-state conditions, the rate of heat flow across wellbore (Q) is proportional to the temperature difference between the fluid and the formation, and the cross-sectional area perpendicular to the direction of heat flow, as provided by Eq. (12):

$$Q = U_j{}^* A_j{}^* \Delta T_j \quad (12)$$

Note that in Eq. (12) and elsewhere herein as appropriate, the subscript (j) refers to a surface on which the calculation is based. For example, if as reference the outside surface area of the pipe is used, then:

$$Q = UP_o{}^* A_j{}^* \Delta T_j \quad (12.1)$$

where
$Up_o$ represents overall heat transfer coefficient;
$A_j$ represents $2\pi r p_o{}^* \Delta L$, or the surface area, outside wall drillstem; and
$\Delta T_j$ represents (Tf-Tp) or the temperature of fluid at the formation and wellbore interface—temperature of fluid in the pipe.

The problem is the solution of two heat transfer coefficients:
$Up_o$ = heat transfer coefficient, drillstem to annulus; and
$U_a$ = heat transfer coefficient, annulus to formation To illustrate the general method of solution, an exemplary calculation for the heat transfer coefficient across the drillpipe is provided in detail.

Consider now a method for estimating the overall heat transfer coefficient across the drillpipe. First, note that the system can generally be split into three distinct thermal resistances: flowing fluid and inside pipe wall; pipe wall thickness; outside pipe wall and annulus. Based on the heat flow rate of Eq. (12), these resistances can be described by Eq. (13, 14 and 15):

1. Flowing fluid and inside pipe wall $$Q_1 = 2\pi r p_i{}^* h_f{}^* (Tp - Tp_i)^* \Delta L \quad (13)$$

2. Across pipe wall $$Q_2 = 2\pi r * K_{pipe} \frac{dT}{dr} * \Delta L \quad (14)$$

Figure 3:
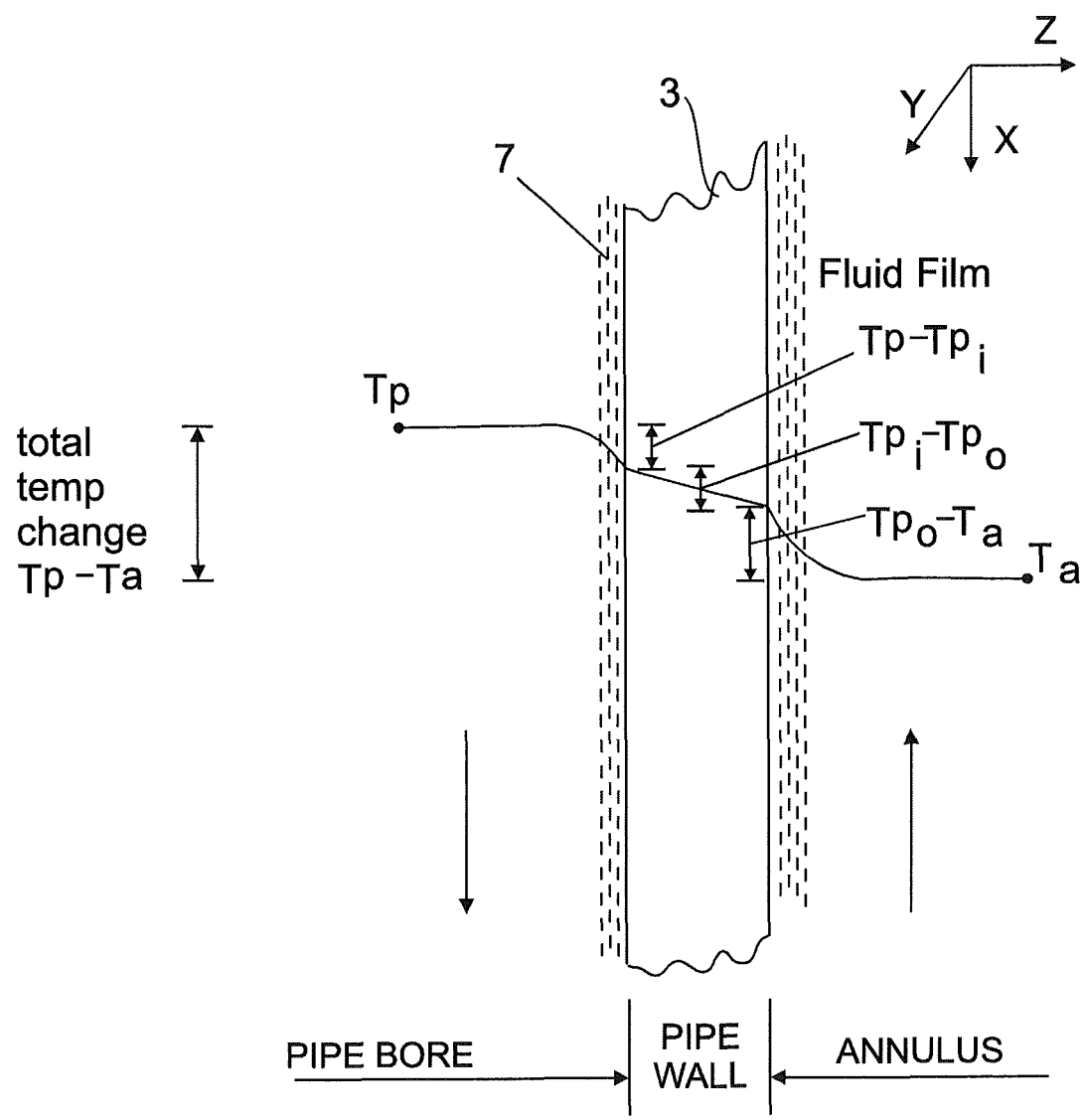
FIG. 3 depicts aspects of a temperature profile within a drillstring and a wellbore.

3. Outside pipe wall and flowing annular fluid $$Q_3 = 2\pi rp_o * h_{f'} * (Tp_o - Ta) * \Delta L \quad (15)$$

where
$r_{pi}$ represents radius, internal, drillpipe, ft
$rp_o$ represents radius, external, drillpipe, ft
$h_f$ represents film coefficient, inside wall drillpipe, Btu/(hr-ft$^2$-° F.)
$h_{f'}$ represents film coefficient, outside wall drillpipe, Btu/(hr-ft$^2$-° F.)
Tp represents temperature of the fluid inside the pipe, ° F.
$Tp_i$ represents temperature, inside pipe wall, ° F.
$K_{pipe}$ represents thermal conductivity, drillpipe, Btu/(hr-ft-° F.)
Ta represents annular fluid temperature, ° F.
$Tp_o$ represents temperature outside pipe wall, ° F.
$\Delta L$ represents length of section of interest, ft Reference may be had to FIG. 3 for a graphic depiction of certain relationships between some of these parameters.

Equation (14) can be rearranged as follows:

$$Q_2 = 2\pi r * K_{pipe}\left(\frac{dT}{dr}\right)\Delta L$$

$$\therefore \frac{dT}{dr} = \frac{Q_2}{2\pi * k_{pipe} * \Delta L} * \frac{1}{r}$$

$$T = \frac{Q_2}{2\pi * k_{pipe} * \Delta L} \int \frac{1}{r} dr$$

and, $$(Tp_i - Tp_o) = \frac{Q_2}{2\pi \Delta L * k_{pipe}} * \ln\frac{rp_o}{rp_i}$$

Rewriting the derivation provides Eq. (16):

$$Q_2 = \frac{2\pi * \Delta L * k_{pipe}(Tp_i - Tp_o)}{\ln\left[\frac{rp_o}{rp_i}\right]} \quad (16)$$

Under steady-state conditions, the heat transfer rates ($Q_1$, $Q_2$, $Q_3$) are equal, and Equations (13), (14), and (15) can be combined to yield Eq. (17):

$$(Tp - Ta) = (Tp - Tp_i) + (Tp_i - Tp_o) + (Tp_o - Ta) \quad (17)$$

$$= \frac{Q}{2\pi rp_i * h_f * \Delta L} + \frac{Q * \ln\left(\frac{rp_o}{rp_i}\right)}{2\pi \Delta L k_{pipe}} + \frac{Q}{2\pi rpo * h_{f'} * \Delta L}$$

$$(Tp - Ta) = \frac{Q}{2\pi \Delta L}\left[\frac{1}{rp_i * h_f} = + \frac{\ln\left(\frac{rp_o}{rp_i}\right)}{k_{pipe}} + \frac{1}{rp_o * h_{f'}}\right]$$

Since the overall heat transfer rate across these elements is given by Eq. (12), such that Eq. (18) may be written:

$$Q = 2\pi rp_o * \Delta L * Up_o * (Tp - Ta) \quad (18)$$

then inserting Eq. (17) into Eq. (18) gives Eq. (19):

$$Up_o = \left[\frac{rp_o}{rp_i * h_f} + \frac{rp_o \ln\left(\frac{rp_o}{rp_i}\right)}{k_{pipe}} + \frac{1}{h_{f'}}\right]^{-1} \quad (19)$$

which provides the overall heat transfer coefficient, $U_{po}$, across the drillpipe, based on the outside surface of the drillpipe ($r_{po}$).

Now consider overall heat transfer coefficient across the wellbore face. Based on the method described previously, the heat transfer coefficient can be written for the general case as:

$$U_a = \left[\frac{1}{h_{f''}} + \frac{r_1 \ln\left(\frac{r_2}{r_1}\right)}{K_1} + \frac{r_1 \ln\left(\frac{r_3}{r_2}\right)}{K_3} + \ldots + \frac{r_1 \ln\left(\frac{r_n}{r_{n-1}}\right)}{K_n}\right]^{-1}$$

where $h_{f''}$ represents a film coefficient of the annulus wall. For an open borehole, let $r_2/r_1 = 10$, and:

$$Ua = \left[\frac{1}{h_{f''}} + \frac{r_h \ln(10)}{K_{fmn}}\right]^{-1}$$

where
$r_1$ represents the radius of the open borehole, ft (=rh);
$r_2$ represents radius to temperature point in formation (=10*rh); and
$k_{fmn}$ represents thermal conductivity, formation, Btu/(hr-ft-° F.).

From the above, the overall heat transfer coefficients can be evaluated based on film coefficients and the thermal conductivities of the "solid" wellbore geometry elements. The thermal conductivities for various materials are listed below; a general method for evaluating film coefficients is given later herein.

Now with regard to calculation of thermal conductivities ($K_i$), the following may be applied:

$$K_{pipe} = 26, \frac{Btu}{(hr\text{-}ft\text{-}° F.)};$$

$$K_{cement} = 0.6, \frac{Btu}{(hr\text{-}ft\text{-}° F.)};$$

$$K_{water} = 0.346, \frac{Btu}{(hr\text{-}ft\text{-}° F.)};$$

$$K_{oil} = \frac{0.0677}{S}[1 - 0.0003(t - 32)], \frac{Btu}{(hr\text{-}ft\text{-}° F.)};$$

and $$K_{emulsions} = Kc\frac{2Kc + Kd - 2\Phi d(Kc - Kd)}{2Kc + Kd + 2\Phi d(Kc - Kd)}.$$

where
Kc represents thermal conductivity, continuous phase;
Kd represents thermal conductivity, discontinuous phase;
$\Phi d$ represents volume fraction of the discontinuous phase; and $$K_{fmn} = K_{mtx}\left[\frac{\Phi^{2/3}(v-1)+1}{\Phi^{2/3}(v-1)t\Phi(1-v)+1}\right].$$

where
  $\Phi$ represents porosity, fractional;
  $K_{fmn}$ represents formation thermal conductivity, Btu/(hr–ft–° F.);
  $K_{mtx}$ represents matrix thermal conductivity, Btu/(hr–ft–° F.);
  $v = K_{pores}/K_{matrix}$, and
    $= K_{water}/K_{matrix}$;
  $K_{qtz} = 1.06$, Btu/(hr–ft–° F.); and
  $K_{lime} = 1.3$, Btu/(hr–ft–° F.).

Now with regard to estimation of film coefficients, the following is provided. Various groups of dimensionless coefficients have been used in the literature and are generally of the following form:

$$N_{NU} = aN_{RE}^{b}N_{PR}^{c}$$

when $N_{NU}$ represents a Nusselt number $= \left(\frac{h \cdot D}{k}\right)$;

$N_{RE}$ represents a Reynolds number $= \left(\frac{D*\rho*v}{\mu}\right)$;

and $N_{PR}$ represents a Prandtl number $= \left(\frac{Cp_m * \mu}{k}\right)$ and
  h represents a film coefficient, Btu/(hr–° F.–ft²);
  D represents flow diameter, ft;
  k represents fluid thermal conductivity Btu/(hr–° F.–ft);
  $\mu$ represents density, lb/ft³;
  v represents fluid viscosity, lb/(ft–hr); and
  $Cp_m$ represents mud specific heat, Btu/(lb–° F.).

In general, the coefficients a, b, and c depend on the flow regime (laminar, transition, turbulent), defined as follows:
  1. laminar, $N_{RE} < 2100$;
  2. transition, $2100 < N_{RE} < 10,000$; and
  3. turbulent, $10,000 < N_{RE}$.

In the cases of laminar and turbulent flow regimes, the coefficients are fairly well known. For laminar flow, ($N_{RE} < 2100$):

$$N_{NU} = 1.86(N_{RE} * N_{PR})^{0.33}\left(\frac{D}{L}\right)^{0.33}$$

where L=length of section, ft.
In the case of turbulent flow, ($10,000 < N_{RE}$)

$$N_{NU} = 0.023 N_{RE}^{0.8} N_{PR}^{0.33}$$

With known flow conditions and mud properties, the film coefficients for these flow regimes can be easily solved. However, for transition flow, the solution is slightly more complicated. That is for transition flow ($2100 < N_{RE} < 10,000$), a general form of the equation is given as:

$$N_{NU} = a(N_{RE}^{2/3} - b)N_{PR}^{1/3} * c;$$

where
  a, b, and c are coefficients
When $N_{RE} = 2100$ or $10,000$, the above equation should agree with the solutions for laminar and turbulent flow respectively.

A solution for the film coefficient in the transition flow regime may be further approximated by the following equation:

$$N_{NU} = .59\left[1 - \frac{(N_{RE} - 2100)}{10,000}\right](N_{RE}^{2/3} - 125)N_{PR}^{1/3}\left[\frac{N_{RE} - 2100}{7900} + \left(\frac{D}{L}\right)^{1/3}\right]$$

Now consider an effect of pipe rotation on film coefficient. When pipe is being rotated in the wellbore, the fluid in direct contact with the pipe (outside drillsteam wall) is probably in a slightly more turbulent flow regime than the rest of the annulus. Accordingly, an effect of such turbulence is to raise the film coefficient of the outer diameter of the drillpipe, as shown above in that an increase in turbulence implies an increase in the Reynolds number. From Eq. (19), this in turn causes an overall increase in the heat transfer coefficient across the drillpipe.

Under such conditions it might be expected that the flowline temperature would increase at the wellsite as RPM decreases due to the more laminar flow regime at low (to zero) rotary speeds, thus resulting in "insulating" the annulus fluids from the cooler mud in the drillstem (i.e., lower film coefficients). In fact, this has been documented for various wellsites, where while circulating bottoms up, for example, at reduced rotary speeds, the flowline temperature often shows abnormal increases. In order to include this observation in the model, the following estimate of the Reynolds number for the outside wall of the drillpipe is made.

$$N_{RE} \text{ for flow} = \left(\frac{D*\rho*v}{\mu}\right);$$

$$N_{RE} \text{ for mixing} = \left(\frac{D^2 * Nr * \rho}{\mu}\right);$$

Adding these give $$(N_{RE})p_o = \frac{\rho D}{\mu}[D * Nr + v]$$

where
  Nr=RPM*60
  $(N_{RE})P_O$ represents the Reynolds number, outside wall, drillstring.
    (if Nr=0 then $(N_{RE})P_O = N_{RE}$)

Accordingly, some embodiments further take into account at least one operational factor, such as an RPM of the drill string 3, length of interest, radius, flow rate, volume (such as of drilling mud within the drill string 3, or total volume within the wellbore) and others.

Further aspects are now provided. These further aspects include a technique for averaging of heat transfer coefficients; and averaging temperature inside and outside of the drillstring.

Consider the following with regard to averaging of heat transfer coefficients. A lagged mud packet will pass through several distinct wellbore geometry sections; each of these sections will have distinct overall heat transfer coefficients ($Up_o$ and $U_a$) due to the physical elements (e.g., casing, openhole, etc.) and different flow regimes.

Thus, the individual heat transfer coefficients may be averaged based on the time the mud packet is in each section. In order to estimate this, let $Up_{oi}$, $U_{ai}$ be the $i^{th}$ drillpipe and wellbore heat transfer coefficient. In this case:

$$\overline{Up_o} = \frac{\sum (\Delta t_i * Up_{oi})}{\sum \Delta t_i};$$

and $$\overline{U_{ai}} = \frac{\sum \Delta t_i * Ua_i}{\sum \Delta t_i}.$$

Where $\Delta t_i$ is the time, in minutes, that the mud packet is in any distinct wellbore section having a constant $Up_o$ or $Ua$. $\Delta t_i$ can be calculated from:

$$\Delta t_i = \left[\frac{\pi}{4*\overline{Q}}(d_h^2 - d_p^2)(.004329)\right];$$

where $d_h$ represents a hole diameter, (generally in inches); and $d_p$ represents the drillstring outer diameter, (also generally in inches); and $\overline{Q}$ represents an average flow rate for the mud packet, gal/min. Accordingly, an average flow rate may be given by:

$$\overline{Q} = \frac{\sum_{r=1}^{n}(\Delta t_r * Q)}{\sum_{r=1}^{n} \Delta t_r};$$

where Q represents mud read flow rate, gpm and $\Delta t_r$ represents mud sample interval, time (seconds or minutes).

Consider now techniques for averaging temperature inside and outside of the drillstem. Unlike other lagged quantities (e.g., Total Gas), the temperature of a mud packet is not isolated from the effects of the mud in the drillstem, or the effects of the wellbore wall as it is circulated to surface. The temperature out depends directly on the temperature of the mud being circulated down the drillstem (generally a heat sink) and the temperature of the wellbore face (at depth, a heat source; close to the surface, a heat sink). Therefore, calculation of both the temperature out and temperature in for a certain depth requires special handling.

Figure 4:
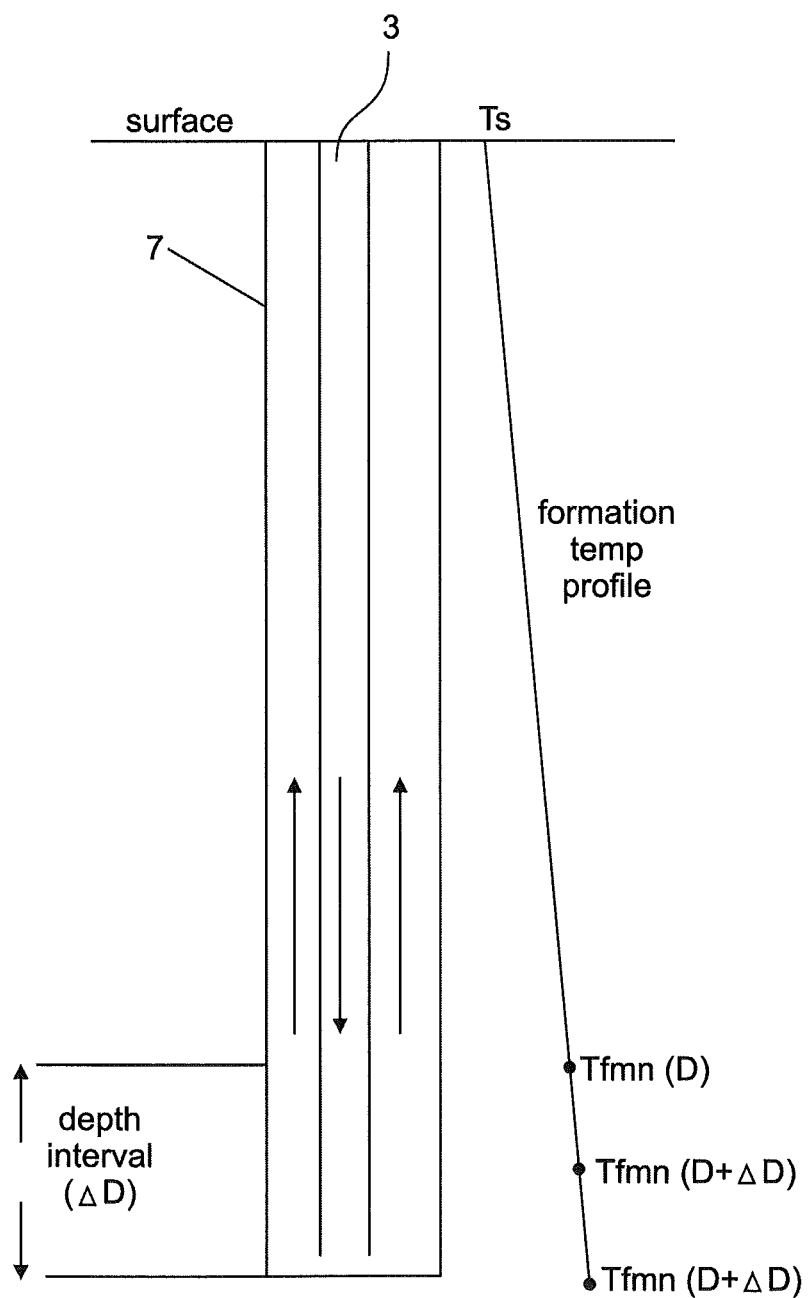
FIG. 4 depicts relationships of temperature parameters as a function of depth.

Consider an example. In this example, let $\Delta d$ be a depth increment. Consider that a user wishes to know the formation temperature at depth $D+\Delta d$. Formation temperature is represented as the average temperature over the interval $\Delta d$. This is reasonably accurate if $\Delta d$ is small in relation to D. Refer to FIG. 4.

In FIG. 4, the model assumes a linear geothermal gradient and the mud packet must pass over a length of formation (wellbore wall) equal to $D+\Delta d$. Average mud temperature out for a depth increment $\Delta d$ is simply the lagged mud temperature for the depth, or $D+\Delta d$.

$$[out]^{D+\Delta d} = \frac{\sum_{i=1}^{n} \Delta S_i * T_{out_i}}{\sum_{i=1}^{n} \Delta S_i};$$

where $\Delta S_i$ represents an averaging base. The averaging is triggered "on" when the return depth is D and triggered "off" when the return depth is $D+\Delta d$.

The average temperature in is, however, not so straightforward. As the mud packet is being circulated to the surface, it is influenced by the temperature in the drillstem, which is governed by the temperature in over the circulation period. At the start of the drilled interval, however, the drillstem contains mud which entered the pipe while the prior interval was being drilled. The "temperature in," which influences the temperature out, may therefore be represented as being the average of: 1. average mud temperature in for a volume equivalent to the volume of the drillstem at depth D; 2. average mud temperature in during the drilled interval $\Delta d$; and 3. average mud temperature in while the mud packet for depth $D+\Delta d$ is being circulated out.

Item 1 requires the prediction of the depth D for online averaging (unless raw data is stored in arrays). Its contribution to the overall average is however small, and it may be ignored. The average mud temperature in is therefore:

$$[\overline{T}_{in}]_D^{D+\Delta d} = \frac{\sum_{i=1}^{n}(\Delta S_i * T_{in_i})}{\sum_{i=1}^{n} \Delta S_i};$$

where $\Delta S_i$ represents an averaging base. The averaging is triggered "on" when the bit is at depth D and triggered "off" when the returns depth is $D+\Delta d$. This is shown diagrammatically in FIG. 5. However, it should be noted that there will be overlap in the average temperature in for sequential depth increments, and the monitor will contain N average temperature in values (being updated "simultaneously") for N mud packets in the wellbore annulus.

In summary, the foregoing equations represent, in detail, a straightforward method of calculating formation temperatures and both annular and drillstem circulating temperatures. Note that the method provided is illustrative. For example, finite difference methods or finite element methods may be used. In general, the method provides results that are within a few degrees. Also, note that temperature measurements made at locations along the drill string 3 may be used to specify other boundary conditions and the model may be modified, or another model developed to include them.

The following interpretations and qualifications should be noted regarding the invention described herein. As used herein, the term "formations" may refer to the various features and materials that may be encountered in a subsurface environment. Accordingly, it should be considered that while the term "formation" generally refers to geologic formations of interest, that the term "formations," as used herein, may, in some instances, include any geologic points or volumes of interest (such as a survey area). In general, the terms formation, formations, and other such terms are in reference to any volume of sub-surface materials that may be of interest.

One skilled in the art will recognize that aspects of the teachings herein may be performed in other ways. For example, it is not necessary to confine the teachings to those embodiments involving a drill string. That is, a logging instrument (such as a instrument deployed in wireline logging of a wellbore—or by a drill string) may make use of the technology provided herein.

As used herein, generation of data in "real time" is taken to mean generation of data at a rate that is useful or adequate for making decisions during or concurrent with processes such as production, experimentation, verification, and other types of surveys or uses as may be opted for by a user or operator. As a non-limiting example, real-time measurements and calculations may provide users with information necessary to make desired adjustments during the drilling process. In one embodiment, adjustments are enabled on a continuous basis (at the rate of drilling), while in another embodiment, adjustments may require periodic cessation of drilling for assessment of data. Such adjustments may also be useful in geosteering applications. Accordingly, it should be recognized that "real-time" is to be taken in context, and does not necessarily indicate the instantaneous determination of data, or make any other suggestions about the temporal frequency of data collection and determination.

In support of the teachings herein, various analysis components may be used, including digital and/or an analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Although certain embodiments are described as being expressed in certain systems of measurement (generally, English), other systems of measurement may be used. For example, the Systems International (SI), the metric system and other systems of measurement may be employed. As appropriate, certain aspects of the teachings herein may be rearranged such that at least some of the quantities are unitless.

Further, various other components may be included and called upon for providing for aspects of the teachings herein. For example, a sample line, sample storage, sample chamber, sample exhaust, pump, piston, power supply (e.g., at least one of a generator, a remote supply and a battery), vacuum supply, pressure supply, refrigeration (i.e., cooling) unit or supply, heating component, motive force (such as a translational force, propulsional force or a rotational force), magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for estimating a far-field temperature within a formation penetrated by a borehole, the method comprising:
   sensing temperatures during circulation of a drilling fluid using a plurality of temperature sensors distributed along a drill string to provide temperature measurement data;
   calculating an overall heat transfer coefficient from the temperature measurement data obtained only during circulation of the drilling fluid and from a drilling fluid film heat transfer coefficient using a processor;
   calculating a geothermal gradient in the formation over a depth interval from the overall heat transfer coefficient using the processor; and
   using the geothermal gradient to estimate the far-field temperature within the formation using the processor.

2. The method as in claim 1, wherein calculating the overall heat transfer coefficient comprises combining heat transfer coefficients associated with sections of the borehole.

3. The method as in claim 1, further comprising: combining a plurality of heat transfer coefficients to provide the overall heat transfer coefficient.

4. The method as in claim 3, wherein combining comprises performing at least one of: averaging, a linear fit, a logarithmic fit, an exponential fit, a fit to a power function, a weighted fit and a least squares fit.

5. The method as in claim 1, wherein the temperature data comprises measurements taken at a plurality of depths within the borehole.

6. The method as in claim 1, the temperature data comprises temperature taken at least one of internal to a drill string and external to a drill string.

7. The method as in claim 1, further comprising estimating the overall heat transfer coefficient by estimating a thermal resistance for at least one of: drilling fluid within a drill string; drilling fluid crossing a wall of a drill string; and drilling fluid external to a drill string and within the borehole.

8. The method as in claim 1, further comprising estimating at least one of: a temperature at a total depth of the borehole and a temperature within the formation at a given radius from a center of the borehole.

9. The method as in claim 1, further comprising accounting for at least one operational factor in the calculating of a geothermal gradient.

10. A system for determining a far-field temperature within a formation penetrated by a borehole, the system comprising:
    a plurality of temperature sensors distributed along a drill string, the drill string providing for the borehole that penetrates the formation; and
    a processor for receiving temperature data sensed during circulation of a drilling fluid from the plurality of temperature sensors along at least a portion of the borehole and for implementing machine executable instructions for calculating an overall heat transfer coefficient from the measurement data obtained only during circulation of the drilling fluid and from a drilling fluid film heat transfer coefficient; calculating a geothermal gradient in the formation over a depth interval from the overall heat transfer coefficient; and using the geothermal gradient to estimate the far-field temperature within the formation.

11. The system as in claim 10, wherein the processor is equipped to implement the machine executable instructions in real time.

12. The system as in claim 10, further comprising an input for receiving at least one parameter of operational data.

13. The system as in claim 12, wherein the processor further comprises instructions for using the operational data to estimate the temperature within the formation.

14. The system as in claim 10, wherein the parameter of operational data comprises at least one of radius, flow rate, revolutions per minute and volume.

15. The system as in claim 10, wherein the plurality of temperature sensors is distributed at least one of internally and externally along the drill string.

16. A non-transitory computer readable medium comprising computer executable instructions for estimating a far-field temperature in a formation penetrated by a borehole, that when executed by a computer, cause the computer to perform the steps of:
  receiving temperature data sensed during circulation of a drilling fluid from a plurality of measurements of temperature taken by a plurality of temperature sensors distributed along a drill string within the borehole traversed by a logging instrument;
  calculating an overall heat transfer coefficient from the measurement data obtained only during circulation of the drilling fluid and from a drilling fluid film heat transfer coefficient;
  calculating a geothermal gradient in the formation over a depth interval from the overall heat transfer coefficient;
  using the geothermal gradient to estimate the temperature in the formation; and
  outputting the estimate to a user.

17. The non-transitory computer readable medium as in claim 16, further comprising the step of receiving an input for a selected depth within the formation and estimating the temperature in the formation at the selected depth.

18. The method as in claim 1, wherein using the geothermal gradient comprises multiplying a depth times the geothermal gradient and adding the product to a surface temperature to estimate the far-field temperature within the formation at the depth.

19. The method as in claim 1, wherein calculating the geothermal gradient comprises solving an equation comprising a flowline temperature, a depth, a temperature in an annulus at the depth, and a mud inlet temperature.

20. The method as in claim 19, wherein the equation further comprises a surface temperature.

21. The method as in claim 1, wherein calculating the overall heat transfer coefficient comprises solving an equation comprising a radius to a point on the formation and a thermal conductivity of the formation.

22. The method as in claim 1, wherein the drilling fluid film heat transfer coefficient comprises at least one of a film coefficient for an inside wall of the drill string, a film coefficient for an outside wall of the drill string, and a film coefficient for a borehole wall.

23. The method as in claim 22, further comprising estimating the film coefficient for an outside wall of the drill string using drill string rotary speed as an input.

* * * * *